(12) United States Patent
Bridenstine et al.

(10) Patent No.: US 11,214,962 B2
(45) Date of Patent: Jan. 4, 2022

(54) TAPERED PLASTERBOARDS AND METHODS FOR MAKING THEM

(71) Applicant: CertainTeed Gypsum, Inc., Malvern, PA (US)

(72) Inventors: John Bridenstine, Dade City, FL (US); Christopher G. Riley, Malvern, PA (US); James Dimitrakopoulos, Conshohocken, PA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 16/147,117

(22) Filed: Sep. 28, 2018

(65) Prior Publication Data

US 2019/0100915 A1    Apr. 4, 2019

Related U.S. Application Data

(60) Provisional application No. 62/566,381, filed on Sep. 30, 2017.

(51) Int. Cl.
*E04C 2/04* (2006.01)
*B32B 3/26* (2006.01)
(Continued)

(52) U.S. Cl.
CPC .............. *E04C 2/043* (2013.01); *B28B 1/002* (2013.01); *B28B 7/0085* (2013.01);
(Continued)

(58) Field of Classification Search
CPC ........... E04C 2/043; B32B 3/263; B32B 3/30; B32B 3/02; B32B 13/08; B32B 13/00;
(Continued)

(56) References Cited

U.S. PATENT DOCUMENTS 2,305,247 A * 12/1942 Fisher .................. E04B 2/7457
52/420
2,811,906 A   11/1957 Chappell
(Continued)

FOREIGN PATENT DOCUMENTS

DE         10054972 B4    3/2006
EP         0 482 810 A1   4/1992
(Continued)

OTHER PUBLICATIONS

International Search Report issued in co-pending International Patent Application No. PCT/US2018/053584, ISA/KR, Korean Patent Office, dated Jan. 30, 2019, 7 pages.
(Continued)

*Primary Examiner* — Donald J Loney
(74) *Attorney, Agent, or Firm* — McDonnell Boehnen Hulbert & Berghoff LLP

(57) ABSTRACT

Disclosed herein are plaster boards having a first surface and an opposing second surface, and a first edge and an opposing second edge that bound the first surface and the second surface. The first surface includes a first section and a second section, the first section being raised compared to the second section, the second section abutting the second edge. The second surface includes a first section and a second section that are separated by a boundary between the first edge and the second edge. The first section of the second surface is substantially parallel to the first section of the first surface. The second section of the second surface slopes toward the first surface from the boundary toward the second edge. Methods for making the plaster boards involve forming wet plaster material and drying the wet plaster material such that the wet plaster material hardens into a plasterboard.

24 Claims, 9 Drawing Sheets

(51) Int. Cl.
  *B28B 19/00* (2006.01)
  *E04B 1/86* (2006.01)
  *B32B 13/08* (2006.01)
  *B28B 11/08* (2006.01)
  *B28B 1/00* (2006.01)
  *B28B 7/00* (2006.01)
  *E04C 2/00* (2006.01)

(52) U.S. Cl.
  CPC ...... *B28B 11/0845* (2013.01); *B28B 19/0092* (2013.01); *B32B 3/263* (2013.01); *B32B 13/08* (2013.01); *E04B 1/86* (2013.01); *B32B 2607/00* (2013.01); *E04C 2002/004* (2013.01); *Y10T 428/24488* (2015.01); *Y10T 428/24612* (2015.01); *Y10T 428/24777* (2015.01)

(58) Field of Classification Search
  CPC ......... B32B 2607/00; Y10T 428/24488; Y10T 428/24612; Y10T 428/24777; B28B 19/0092; B28B 11/0845; B28B 1/002; B28B 7/0085
  See application file for complete search history.

(56) References Cited

U.S. PATENT DOCUMENTS

| | | | |
|---|---|---|---|
| 3,047,447 A | 7/1962 | Stasse | |
| 3,160,549 A | 12/1964 | Caldwell et al. | |
| 3,215,225 A | 11/1965 | Kirschner | |
| 3,336,710 A | 8/1967 | Raynes | |
| 3,399,104 A | 8/1968 | Ball, III et al. | |
| 3,424,270 A | 1/1969 | Hartman et al. | |
| 3,462,899 A | 8/1969 | Sherman | |
| 3,513,009 A | 5/1970 | Austin et al. | |
| 3,579,941 A | 5/1971 | Tibbals | |
| 3,642,511 A | 2/1972 | Cohn et al. | |
| 3,828,504 A | 8/1974 | Egerborg et al. | |
| 3,960,580 A | 6/1976 | Stierli et al. | |
| 4,003,752 A | 1/1977 | Osohata et al. | |
| RE29,157 E | 3/1977 | Petersen et al. | |
| 4,112,176 A | 9/1978 | Bailey | |
| 4,134,956 A | 1/1979 | Suzuki et al. | |
| 4,156,615 A | 5/1979 | Cukier et al. | |
| 4,174,229 A | 11/1979 | Boberski et al. | |
| 4,347,912 A | 9/1982 | Flocke et al. | |
| 4,361,995 A | 12/1982 | Buck et al. | |
| 4,375,516 A | 3/1983 | Barrall | |
| 4,474,840 A | 10/1984 | Adams | |
| 4,487,793 A | 12/1984 | Haines et al. | |
| 4,557,970 A | 12/1985 | Holtrop et al. | |
| 4,618,370 A | 10/1986 | Green et al. | |
| 4,642,951 A | 2/1987 | Mortimer | |
| 4,663,224 A | 5/1987 | Tabata et al. | |
| 4,678,515 A | 7/1987 | Green et al. | |
| 4,685,259 A | 8/1987 | Eberhart et al. | |
| 4,759,164 A | 7/1988 | Abendroth et al. | |
| 4,778,028 A | 10/1988 | Staley | |
| 4,786,543 A | 11/1988 | Ferm | |
| 4,924,969 A | 5/1990 | K'Heureux | |
| 4,956,321 A | 9/1990 | Barrall | |
| 4,967,530 A | 11/1990 | Clunn | |
| 5,016,413 A | 5/1991 | Counihan | |
| 5,026,593 A | 6/1991 | O'Brien | |
| 5,033,247 A | 7/1991 | Clunn | |
| 5,063,098 A | 11/1991 | Niwa et al. | |
| 5,110,660 A | 5/1992 | Wolf et al. | |
| 5,125,475 A | 6/1992 | Ducharme et al. | |
| 5,158,612 A | 10/1992 | Savoly et al. | |
| 5,240,639 A | 8/1993 | Diez et al. | |
| 5,256,223 A | 10/1993 | Alberts et al. | |
| 5,258,585 A | 11/1993 | Juriga | |
| 5,334,806 A | 8/1994 | Avery | |
| 5,342,465 A | 8/1994 | Bronowicki et al. | |
| 5,368,914 A | 11/1994 | Barrett | |
| 5,439,735 A | 8/1995 | Jamison | |
| 5,473,122 A | 12/1995 | Kodiyalam et al. | |
| 5,502,931 A | 4/1996 | Munir | |
| 5,601,888 A | 2/1997 | Fowler | |
| 5,603,192 A | 2/1997 | Dickson | |
| 5,629,503 A | 5/1997 | Thomasen | |
| 5,637,384 A | 6/1997 | Boot | |
| 5,643,666 A | 7/1997 | Eckart et al. | |
| 5,664,397 A | 9/1997 | Holz | |
| 5,691,037 A | 11/1997 | McCutcheon et al. | |
| 5,695,867 A | 12/1997 | Saitoh et al. | |
| 5,768,841 A | 6/1998 | Swartz et al. | |
| 5,824,973 A | 10/1998 | Haines et al. | |
| 5,851,632 A * | 12/1998 | Chen | A63B 49/08 428/156 |
| 5,867,957 A | 2/1999 | Holtrop | |
| 5,910,082 A | 6/1999 | Bender et al. | |
| 5,945,208 A | 8/1999 | Richards et al. | |
| 5,954,497 A | 9/1999 | Cloud et al. | |
| 6,077,613 A | 6/2000 | Gaffigan | |
| 6,123,171 A | 9/2000 | McNett et al. | |
| 6,133,172 A | 10/2000 | Sevenish et al. | |
| 6,213,252 B1 | 4/2001 | Ducharme | |
| 6,240,704 B1 | 6/2001 | Porter | |
| 6,266,427 B1 | 7/2001 | Mathur | |
| 6,286,280 B1 | 9/2001 | Fahmy et al. | |
| 6,290,021 B1 | 9/2001 | Standgaard | |
| 6,309,985 B1 | 10/2001 | Virnelson et al. | |
| 6,342,284 B1 | 1/2002 | Yu | |
| 6,381,196 B1 | 4/2002 | Hein et al. | |
| 6,389,771 B1 | 5/2002 | Moller | |
| 6,391,958 B1 | 5/2002 | Luongo | |
| 6,443,256 B1 | 9/2002 | Baig | |
| 6,632,550 B1 | 10/2003 | Yu | |
| 6,676,744 B2 | 1/2004 | Merkley et al. | |
| 6,699,426 B1 | 3/2004 | Burke | |
| 6,715,241 B2 | 4/2004 | Gelin et al. | |
| 6,758,305 B2 | 7/2004 | Gelin et al. | |
| 6,790,520 B1 | 9/2004 | Todd et al. | |
| 6,800,161 B2 | 10/2004 | Takigawa | |
| 6,803,110 B2 | 10/2004 | Drees et al. | |
| 6,815,049 B2 | 11/2004 | Veeramasuneni | |
| 6,822,033 B2 | 11/2004 | Yu | |
| 6,825,137 B2 | 11/2004 | Fu et al. | |
| 6,877,585 B2 | 4/2005 | Tinianov | |
| 6,913,667 B2 | 7/2005 | Nudo et al. | |
| 6,920,723 B2 | 7/2005 | Downey | |
| 6,941,720 B2 | 9/2005 | Deford et al. | |
| 7,041,377 B2 | 5/2006 | Miura et al. | |
| 7,068,033 B2 | 6/2006 | Sellers et al. | |
| 7,181,891 B2 | 2/2007 | Surace et al. | |
| 7,197,855 B2 | 4/2007 | Della Pepa | |
| 7,255,907 B2 | 8/2007 | Feigin et al. | |
| 7,745,005 B2 | 6/2010 | Tinianov | |
| 7,799,410 B2 | 9/2010 | Tinianov | |
| 7,883,763 B2 | 2/2011 | Tinianov | |
| 8,277,586 B2 * | 10/2012 | Laurent | B28B 11/0863 156/220 |
| 8,424,251 B2 | 4/2013 | Tinianov | |
| 9,388,568 B2 | 7/2016 | Tinianov | |
| 9,512,613 B2 | 12/2016 | Blades | |
| 2003/0211305 A1 | 11/2003 | Koval | |
| 2004/0016184 A1 | 1/2004 | Huebsch | |
| 2004/0168853 A1 | 9/2004 | Gunasekera | |
| 2004/0214008 A1 | 10/2004 | Dobrusky | |
| 2005/0103568 A1 | 5/2005 | Sapoval | |
| 2005/0106375 A1 | 5/2005 | Kimura et al. | |
| 2005/0159057 A1 | 7/2005 | Hauber et al. | |
| 2005/0263925 A1 | 12/2005 | Heseltine | |
| 2006/0048682 A1 | 3/2006 | Wagh | |
| 2006/0057345 A1 | 3/2006 | Surace | |
| 2006/0059806 A1 | 3/2006 | Gosling | |
| 2006/0108175 A1 | 5/2006 | Surace | |
| 2007/0094950 A1 | 5/2007 | Surace | |
| 2007/0107350 A1 | 5/2007 | Surace | |
| 2011/0061324 A1 | 3/2011 | Tinianov | |
| 2013/0240291 A1 | 9/2013 | Tinianov | |

(56) References Cited

U.S. PATENT DOCUMENTS

| | | |
|---|---|---|
| 2015/0218804 A1 | 8/2015 | Payot |
| 2016/0153187 A1 | 6/2016 | Desai |
| 2017/0037617 A1 | 2/2017 | Blades |

FOREIGN PATENT DOCUMENTS

| | | |
|---|---|---|
| EP | 1 591 599 A1 | 11/2005 |
| JP | H09203153 A | 8/1997 |
| KR | 10-2004-0057166 | 7/2004 |
| KR | 20140113068 A | 9/2014 |
| WO | 1996034261 A1 | 10/1996 |
| WO | 1997019033 A1 | 5/1997 |
| WO | 2000024690 A1 | 5/2000 |
| WO | 2007/129228 A2 | 11/2007 |

OTHER PUBLICATIONS

Written Opinion issued in co-pending International Patent Application No. PCT/US2018/053584, ISA/KR, Korean Patent Office, dated Jan. 30, 2019, 6 pages.

Lippiatt, B.C., National Institute of Standards and Technology. BEES 3.0, "Building for Environmental and Economic Sustainability Technical Manual and User Guide", Oct. 2002, (198 pages).

CertainTeed, "QuietRock 510 Installation Instructions", Jul. 2010, (date accessed Aug. 13, 2014), httpsL//www.certainteed.com/resources/CTG_2823_QR510_Installation_E.pdf.*

Noise Killer: Pro Damping Compound Materials http://www.tnt-audio.com/clinica/noise.html May 18, 2007, 1998 (3 pages).

Sharp, B.H. "A Study of Techniques to Increase the Sound Insulation of Building Elements" Prepared for the Department of Housing and Urban Development, Washington, D.C. Jun. 1973.

Patent Examination Report No. 1 dated Apr. 24, 2013, from Australian Application No. 2008237205, 5 pages.

Marty, R. "Data support use of P-Cell in diabetic footwear", CMP Media LLC, Mar. 1, 2003.

Ostegaard, P.B. et al. "Transmission Loss of Leaded Building Materials," The Journal of the Acoustical Society of America, vol. 35, No. 6, Jun. 1963.

Unified Facilities Criteria (UFC) Noise and Vibration Control, UFC 3-450-01. May 15, 2003, Department of Defense.

Wood Handbook/Wood as an Engineering Material, United States Department of Agriculture, Forest Service, General Technical Report FPL-FGTR-113, Mar. 1999.

ASC WallDamp materials from Acoustic Sciences Corporation https://web.archive.org/web/20021013031149/http://www.asc-soundproof.com/index-walldamp.htm, archive date 2002 (accessed May 3, 2021) 11 pages.

ADM Technologies, USA, Dynamic Control http://web.archive.org/web/20010518083911/www.admteschusa.com:80/, archive date 2002 (accessed May 3, 2021) 21 pages.

Nordisk Akustik A/S materials, LDL for sandwhich-construktions, http://web.archive.org/web/200206240933724/www.nordisk-akustik.dk/html_uk/prod03.html, archive date Jun. 24, 2002 (accessed May 3, 2021) 2 pages.

Noxon, A.M. "The Chain is as Strong as Its Weakest Link" Acoustic Science Corporation. http://www.art-noxon.com/articles/chain.htm, Copyright 2009 (accessed May 3, 2021). 8 pages.

* cited by examiner

TAPERED PLASTERBOARDS AND METHODS FOR MAKING THEM

CROSS-REFERENCE TO RELATED APPLICATIONS

This application claims the benefit of priority of U.S. Provisional Patent Application No. 62/566,381, which is hereby incorporated herein by reference in its entirety.

BACKGROUND OF THE DISCLOSURE

1. Field of the Disclosure

The present disclosure relates generally to tapered sound damping plaster boards and methods for making them. The present disclosure relates more particularly to plaster boards having a first surface defined by a first section that is raised compared to a second section, and a second opposing surface that has a sloped or tapered section.

2. Technical Background

A. Tapered Plasterboards

Plaster boards, also known as "drywall boards," are typically used to construct walls within homes, businesses, or other buildings. Plaster boards are very often made of gypsum, but other materials, including lime and cement, are also used. A typical method for making a plaster board involves dispensing and spreading a wet plaster material (e.g., a slurry of gypsum in water) onto a paper or fiberglass liner on a platform, and covering the plaster material with another paper or fiberglass liner. This sandwiched structure is fed through an extruder (e.g., two opposing parallel plates) to provide a structure of a desired thickness and allowed to cure to form a hardened plaster material disposed between the two liners of paper or fiberglass. The plaster board may be cut into sections having predetermined lengths and widths that conform to accepted construction standards.

To form walls having varying dimensions and/or holes that accommodate utility fixtures, it is common to score and snap multiple plasterboards into various shapes and sizes and install the plasterboards edge-to-edge such that they face wall studs and/or fit around the utility outlets. The wall formed by the plasterboards will generally be more aesthetically pleasing if the "joints" where the plasterboards contact each other edge-to-edge are concealed or otherwise not easily discernable.

To this end, some plasterboards are formed to have an edge section of a front surface that tapers or slopes inward toward the opposing back surface of the plasterboard, away from a flat interior section of the front surface. Generally, such plasterboards will have sections that slope toward the back surface at two opposing ends. A tapered edge section may be placed against wall studs next to a tapered edge section of another plasterboard. When placed next to each other, the tapered sections of two plasterboards form a slight depression or "v-shaped" region having a small gap where the edges of the respective plasterboards meet. The gap is then covered with joint tape and the joint tape and the depression formed by the two plasterboards is covered with joint compound (e.g., "mud" or "joint cement"). The wet joint compound applied near the joint is smoothed and flattened with a trowel. Subsequently, some of the dried joint compound is abrasively removed (e.g., sanded) from the exposed surfaces of the plasterboards, resulting in a relatively flat and continuous interface between the two plasterboards.

When non-tapered plasterboards are used, obtaining the flat and continuous interface between the two plasterboards becomes more difficult. For example, it is difficult to apply joint compound to fill the gap between the plasterboards without at least some of the joint compound spilling onto the front surface of one or both plasterboards. Generally, any joint compound that spills onto the front surface of either non-tapered plasterboard will need to be abrasively removed to yield a flat and continuous interface between the plasterboards. This is because any joint compound that remains on the front surface of a non-tapered plasterboard will constitute a protrusion from an otherwise substantially flat front surface.

In contrast, wet joint compound can be placed on tapered regions of two adjacent plasterboards to "fill in" the depression formed by the adjacent tapered regions. A trowel can be used, with a flat interior section of the tapered plasterboard as a guide, to smooth the joint compound to form an interface that is nearly coplanar with the flat interior surfaces of the adjacent tapered plasterboards. As a result, a reduced amount of joint compound may protrude from the flat surface of the plasterboards, reducing the time and effort required to abrasively remove joint compound to further obscure the gap between the two plasterboards.

B. Sound Damping Plasterboards

Soundproofing is becoming an ever-increasing concern for the construction industry, for example, for use in residences, hotels, schools, and hospitals. Soundproofing is also desirable in the construction of theaters and music studios, to insulate noise made in those areas from surrounding rooms. Model building codes and design guidelines often specify minimum Sound Transmission Class values for wall structures within buildings. While a number of construction techniques have been used to address the problem of soundproofing, one especially desirable technique uses sound damping plaster boards that can be used in place of conventional plaster boards in various residential or commercial structures.

A sound damping plaster board typically includes a damping layer having viscoelastic properties disposed between first and second layers of hardened plaster material. In some cases, the damping layer may be disposed between respective paper or fiberglass liners adhered to the first and second layers of hardened plaster material. The damping layer is typically more efficient at sound damping than the layers of hardened plaster material on either side of the damping layer.

C. Tapered Sound Damping Plasterboards

Sound damping plasterboards can also include tapered edge sections. For example, a sound damping plasterboard can be formed from a non-tapered plasterboard blank and a tapered plasterboard blank. The non-tapered plasterboard blank and the tapered plasterboard blank initially both include a liner (e.g., paper) on both opposing surfaces that helps hold the shape of the plasterboard blanks as they dry and harden during the formation process. Subsequently, the liner on what will become the inner surface of each plasterboard blank is abrasively removed (e.g., sanded). Next, the exposed surfaces of the plasterboard blanks are adhered together to form a sandwich structure with a viscoelastic polymer or another sound damping layer between the two plasterboard blanks. The non-tapered plasterboard blank forms the back layer of the tapered sound damping plasterboard and the tapered plasterboard blank forms the front layer of the tapered sound damping plasterboard.

However, there are disadvantages to current methods for abrasively removing the liner from the back surface of a tapered plasterboard blank. For example, the abrasive removal process generally involves a roller having an abrasive surface (e.g., sandpaper) spinning and rubbing against the back surface of the tapered plasterboard blank as it is conveyed or otherwise passes underneath the roller. As this occurs, the flat interior section of the front surface of the tapered plasterboard blank is supported by the conveyor (or another surface) while tapered edge section of the front surface of the tapered plasterboard blank is not supported. This often causes at least a portion of the tapered edge section to be forced downward by the roller above, which can cause the plaster material along the edge to break away from the rest of the plaster material. As a result, the finished tapered sound damping plasterboard might not meet taper specifications or might not include a tapered section at all.

Accordingly, what is needed are plasterboards (e.g., plasterboard blanks) that are not as susceptible to breakage caused by an abrasive roller applying force from above and methods for forming such plasterboards.

SUMMARY OF THE DISCLOSURE

One aspect of the disclosure is a plasterboard that includes a first surface and an opposing second surface, and a first edge and an opposing second edge that bound the first surface and the second surface. The first surface includes a first section and a second section, the first section is raised compared to the second section, and the second section abuts the second edge. The second surface includes a first section and a second section that are separated by a boundary between the first edge and the second edge, the first section of the second surface is substantially parallel to the first section of the first surface, and the second section of the second surface slopes toward the first surface from the boundary toward the second edge.

Another aspect of the disclosure is a method of forming a plasterboard. The method includes providing wet plaster material having a first surface and an opposing second surface. The wet plaster material has a first edge and an opposing second edge that bound the first surface and the second surface. The method also includes forming the first surface into a first section and a second section. The first section is raised compared to the second section and the second section abuts the second edge. The method also includes forming the second surface into a first section and a second section that are separated by a boundary between the first edge and the second edge. The first section of the second surface is substantially parallel to the first section of the first surface and the second section of the second surface slopes toward the first surface from the boundary toward the second edge. The method also includes drying the wet plaster material such that the wet plaster material hardens into a plasterboard.

Additional aspects will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
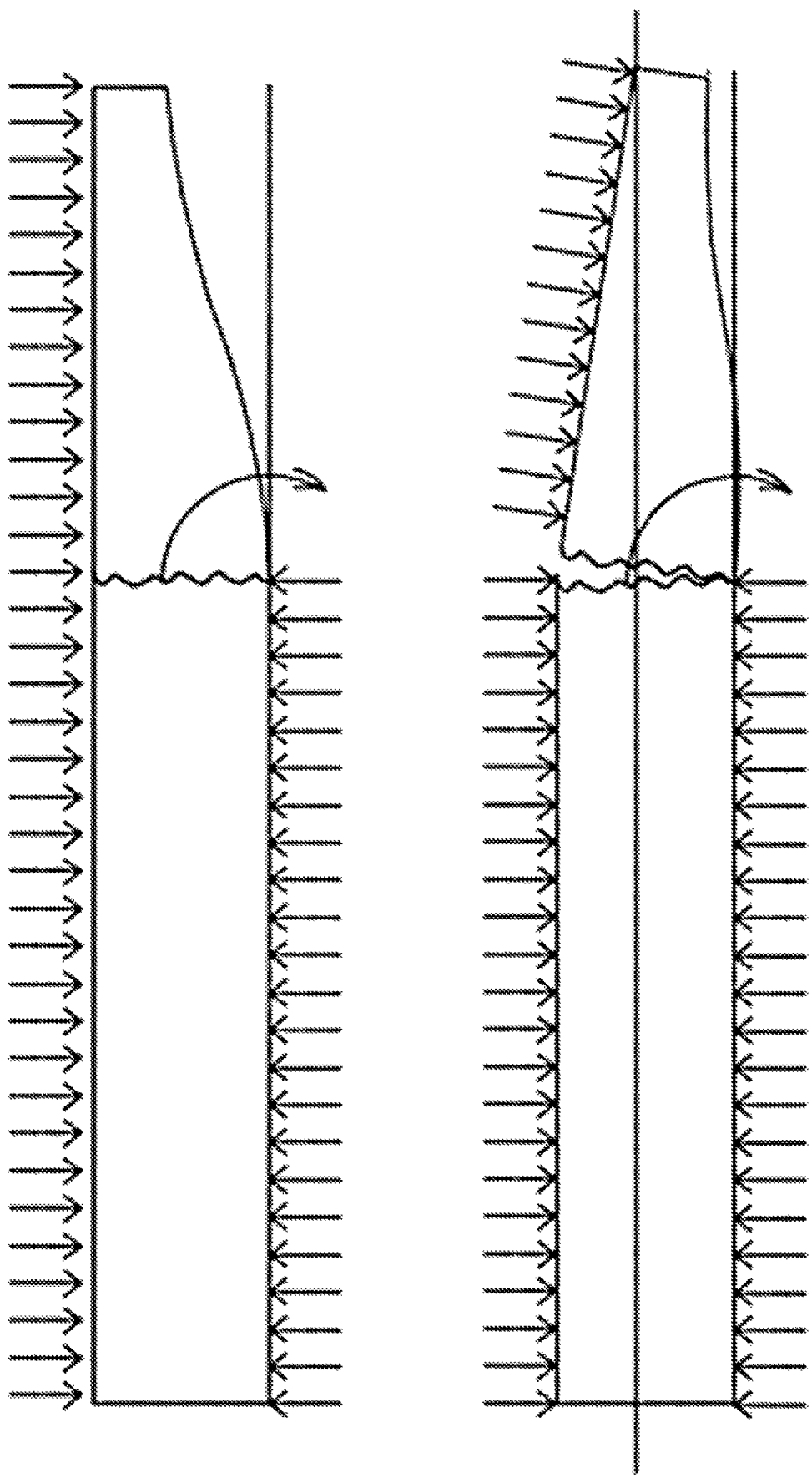
FIG. 1 is a set of two schematic cross-sectional views of a plasterboard breaking during abrasive removal of a facing layer according to one embodiment of the disclosure.

As noted above, the present inventors have noted disadvantages of tapered plasterboard blanks and methods for using tapered plasterboard blanks to form tapered sound damping plasterboards. Accordingly, one aspect of the disclosure is a plasterboard (e.g., hardened plaster material) that includes a first surface and an opposing second surface, and a first edge and an opposing second edge that bound the first surface and the second surface. The first surface includes a first section and a second section and the first section is raised compared to the second section. The second section of the first surface abuts the second edge. The second surface includes a first section and a second section that are separated by a boundary between the first edge and the second edge. The first section of the second surface is substantially parallel to the first section of the first surface, and the second section of the second surface slopes toward the first surface from the boundary toward the second edge. The structural features of the plasterboard (e.g., plasterboard blank) noted above can cause the tapered plasterboard blank to be more resistant to breakage during processing to form a tapered sound damping plasterboard, as described below.

In certain embodiments as otherwise described herein, the second section of the second surface abuts the second edge.

In certain embodiments as otherwise described herein, the first section of the first surface is substantially parallel to the second section of the first surface. More specifically, the first section of the first surface and the second section of the first surface may be separated by a step-shaped boundary or interface. Such a step-shaped boundary may be substantially perpendicular to the first section of the first surface and/or the second section of the first surface. In other embodiments, the first section of the first surface and the second section of the first surface are separated by a sloped boundary.

By the term "substantially" with reference to spatial relationships, amounts, or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In certain embodiments, the first section of the first surface is raised above the second section of the first surface by an amount that is at least 0.01 inches, e.g., at least 0.02 inches or even at least 0.025 inches. In certain embodiments, the first section of the first surface is raised above the second section of the first surface by an amount that is no more than 0.2 inches, for example, no more than 0.1 inches, or even no more than 0.05 inches. In certain embodiments, the first section of the first surface is raised above the second section of the first surface within a range of 0.02 inches to 0.04 inches, within a range of 0.025 inches to 0.035 inches, or within a range of 0.028 inches to 0.032 inches.

Additionally, in certain embodiments as otherwise described herein, a width of the second section of the first surface is no more than 12 inches, no more than 6 inches, or even no more than 3.5 inches. For example, in certain embodiments, the width of the second section of the first surface is within a range of 0.5 to 3.5 inches. In this context, the width is defined as spanning between (i) a boundary that separates the first section of the first surface and the second section of the first surface and (ii) the second edge.

In similar fashion, in certain embodiments as otherwise described herein, a width of the second section of the second surface is no more than 12 inches, no more than 6 inches, or even no more than 3.5 inches. For example, in certain embodiments, the width of the second section of the second surface is within a range of 0.5 to 3.5 inches. In this context, the width is defined as spanning between (i) the boundary that separates the first section of the second surface and the second section of the second surface and (ii) the second edge.

In certain embodiments as otherwise described herein, a width of the second section of the first surface is no more than 50%, or even no more than 20% different than the width of the second section of the second surface. For example, in certain embodiments as otherwise described herein, a width of the second section of the first surface is substantially equal to a width of the second section of the second surface. The width of the second section of the first surface spans between (i) a boundary that separates the first section of the first surface and the second section of the first surface and (ii) the second edge. The width of the second section of the second surface spans between (i) the boundary that separates the first section of the second surface and the second section of the second surface and (ii) the second edge.

But in an alternative embodiment, the width of the second section of the first surface is at least twice as large as a width of the second section of the second surface. In yet another alternative embodiment, the width of the second section of the second surface is at least twice as large as the width of the second section of the first surface.

In some embodiments, the first section of the first surface extends beyond the boundary that separates the first section of the second surface and the second section of the second surface. Or, the second section of the first surface may extend beyond the boundary that separates the first section of the second surface and the second section of the second surface.

Another aspect of the disclosure is a method of forming a plasterboard. The method includes providing (e.g., dispensing onto a conveyor or a facing layer that is on top of a conveyor) wet plaster material having a first surface and an opposing second surface. The wet plaster material has a first edge and an opposing second edge that bound the first surface and the second surface. The method further includes forming the first surface into a first section and a second section, the first section being raised compared to the second section. The second section of the first section abuts the second edge. The method further includes forming the second surface into a first section and a second section that are separated by a boundary between the first edge and the second edge. The first section of the second surface is substantially parallel to the first section of the first surface and the second section of the second surface slopes toward the first surface from the boundary toward the second edge. The method further includes drying the wet plaster material such that the wet plaster material hardens into a plasterboard.

In certain embodiments as otherwise described herein, the first surface is formed by using a first guide element, such as a bar or flap that hangs down to shape the wet plaster material (e.g., through a liner placed on the wet plaster material such that the first guide element pushes against the liner into the wet plaster material to form the first surface). More specifically, in certain embodiments the first surface may be formed by using a first part of the first guide element to form the first section of the first surface, and by using a second part of the first guide element to form the second section of the first surface. For example, the second part of the first guide element may extend beyond (e.g., below) the first part of the first guide element toward the wet plaster material. In certain embodiments, the first part of the first guide element and the second part of the first guide element form a step-shaped structure. Additionally, the first part of the first guide element may include a surface that is substantially parallel to a surface of the second part of the first guide element.

In certain embodiments, the first guide element is used to form the first surface such that the first section of the first surface is substantially parallel to the second section of the first surface (e.g., by forming a step-shaped boundary that is substantially perpendicular to the first section of the first surface and the second section of the first surface).

The first surface may be formed using the first guide element such that the first section of the first surface is raised above the second section of the first surface by any amount as described above, e.g., at least 0.01 inches, or at least 0.02 inches, and/or no more than 0.1 inches, e.g., no more than 0.05 inches, for example, within a range of 0.02 inches to 0.04 inches, within a range of 0.025 inches to 0.035 inches, or within a range of 0.028 inches to 0.032 inches.

The first guide element may also be used to form the first surface such that a width of the second section of the first surface is as described above, for example, no more than 12 inches, no more than 6 inches, no more than 4 inches, no more than 3.5 inches, or within a range of 0.5 to 3.5 inches. In this context, the width is defined as spanning between (I) a boundary that separates the first section of the first surface and the second section of the first surface and (ii) the second edge.

In certain embodiments, the second surface may be formed by using a second guide element. More particularly, the second guide element may include a first part (e.g., a conveyor surface or a platform) used to form the first section of the second surface and a second part (e.g., a wedge-shaped shim or a taper belt having a tapered profile) used to form the second section of the second surface. The second part of the second guide element may extend beyond (e.g., above) the first part of the second guide element toward the wet plaster material. More specifically, the first part of the second guide element may support the wet plaster material and the second part of the second guide element may be above or extend above the first part of the second guide element.

The second guide element may be used to form the second surface such that a width of the second section of the second surface as described above, for example, no more than 12 inches, no more than 6 inches, no more than 4 inches, no more than 3.5 inches, or within a range of 0.5 to 3.5 inches. In this context, the width of the second section of the second surface is defined as spanning between (i) the boundary that separates the first section of the second surface and the second section of the second surface and (ii) the second edge.

In certain embodiments, the first edge of the wet plaster material may be formed against one or more first edge guide elements, and the second edge of the wet plaster material may be formed against one or more second edge guide elements.

The person of ordinary skill in the art will understand that the use of guide elements is conventional in the art, and will adapt conventional guide element techniques for use in the methods described herein.

In some embodiments, the first surface is formed such that the first section of the first surface extends beyond the boundary that separates the first section of the second surface and the second section of the second surface. In other embodiments, the first surface is formed such that the second section of the first surface extends beyond the boundary that separates the first section of the second surface and the second section of the second surface.

In particular embodiments, the method includes applying a facing layer (e.g., a paper or fiberglass liner) to the first surface of the wet plaster material, and after drying the wet plaster material such that the wet plaster material hardens into the plasterboard, abrasively removing the facing layer and a portion of the plasterboard beneath the first section of the first surface of the plasterboard such that the first surface becomes substantially flat at the level of the second section of the first surface.

In some embodiments, the plasterboard is a first plasterboard (e.g., plasterboard blank) that is used to form a sound damping plasterboard. In this context, the method may further include applying a viscoelastic polymer to the substantially flat first surface of the first plasterboard and/or to a surface of a second plasterboard (e.g., plasterboard blank), and securing the first plasterboard to the second plasterboard via the viscoelastic polymer.

One embodiment of a plasterboard (e.g., plasterboard blank) is described below with respect to FIG. 1, which shows two views. The upper portion of FIG. 1 depicts a tapered plasterboard during abrasive removal of a facing layer, such as paper (not shown). The tapered plasterboard is supported by a platform (e.g., a conveyor) from underneath and an abrasive instrument (e.g., a roller) impacts the plasterboard from above to abrasively remove (e.g., sand) the facing layer from the top surface of the plasterboard. Notably, the tapered underside section of the plasterboard is not supported by the platform. As shown in the bottom portion of FIG. 1, the downward force applied by the abrasive instrument above the unsupported tapered underside section may cause the plasterboard to snap undesirably to lose some or all of its tapered section.

Figure 2:
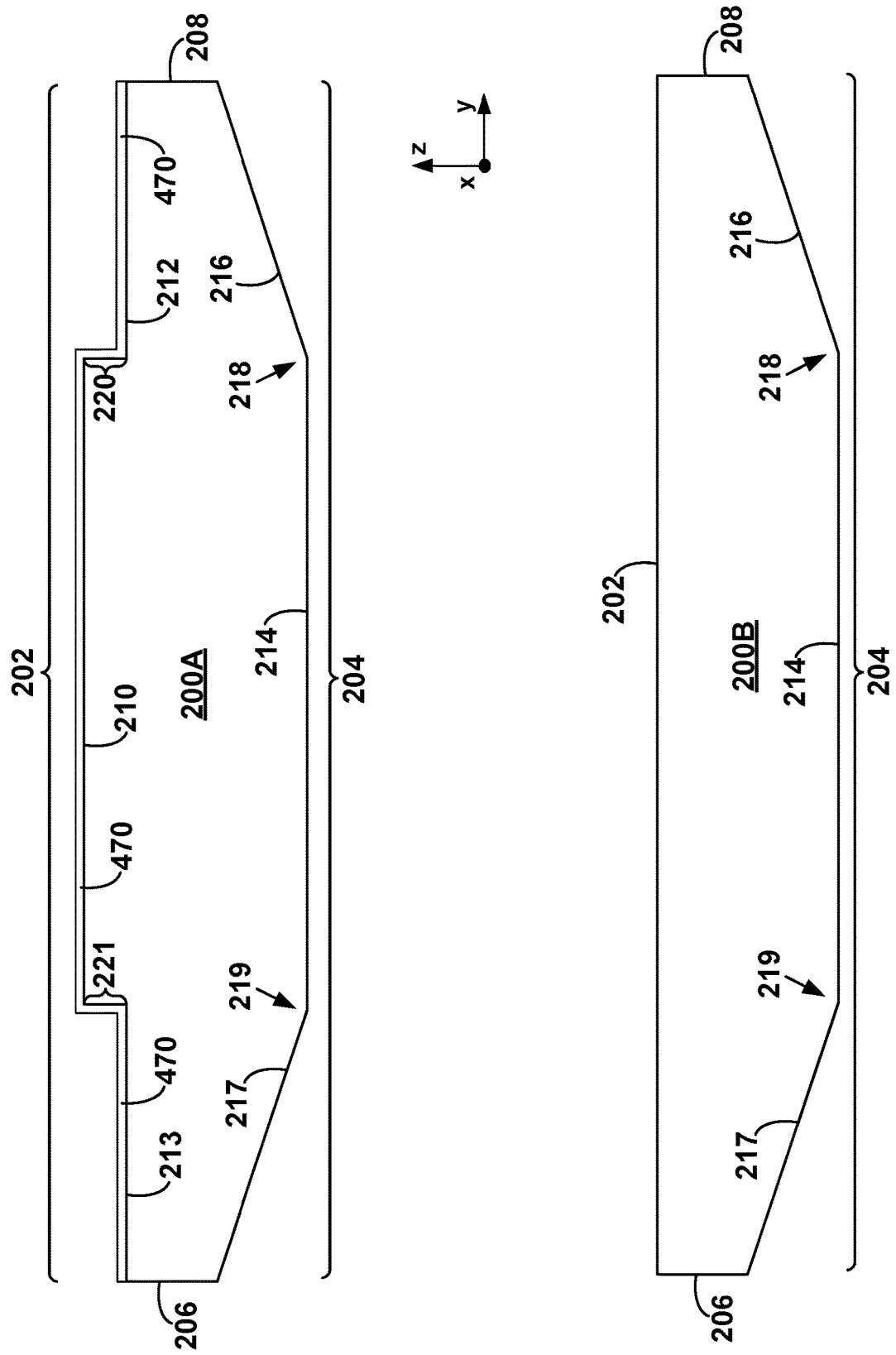
FIG. 2 is a set of two schematic cross-sectional views of plasterboards according to another embodiment of the disclosure.

FIG. 2 depicts two embodiments of a plasterboard. The upper portion of FIG. 2 depicts a plasterboard 200A that may be suitable for processing via methods described below. The plasterboard 200A includes a facing layer 470 (e.g., paper) on its surface 202. Other embodiments of the plasterboard include a facing layer on its bottom surface, but such a facing layer is omitted from the upper portion of the FIG. 2 for ease of illustration.

Figure 8:
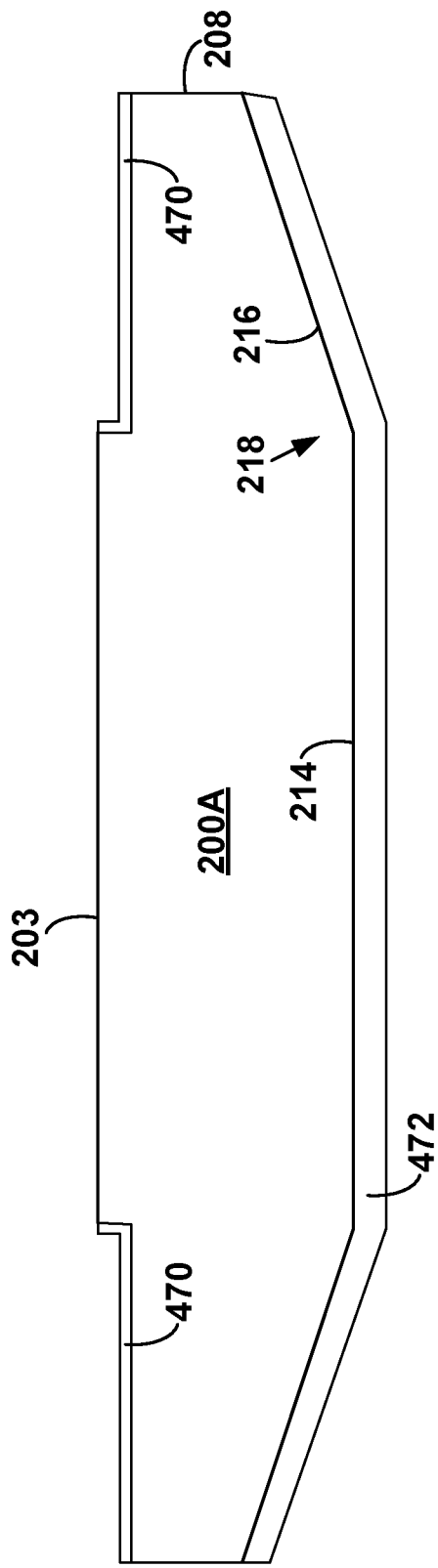
FIG. 8 is a schematic cross-sectional view of a plaster board after removal of a facing layer according to another embodiment of the disclosure.

The lower portion of FIG. 2 depicts a plasterboard 200B that has been processed via methods described below. More specifically, the facing layer 470 has been removed from the plasterboard 200A and the surface 202 has been processed to be substantially flat. The plasterboard 200B may be a suitable component of a tapered sound damping plasterboard (see FIG. 8).

The plasterboard 200A (e.g., hardened plaster material) includes a surface 202 and an opposing surface 204. The plasterboard 200A further includes an edge 206 and an opposing edge 208 that bound the surface 202 and the surface 204. The surface 202 includes a section 210, a section 212, and a section 213. The section 210 is raised compared to the section 212 and the section 213. The section 212 abuts the edge 208 and the section 213 abuts the edge 206. The surface 204 includes a section 214 and a section 216 that are separated by a boundary 218 between the edge 206 and the edge 208. The surface 204 also includes a section 217 that is separated from the section 214 by a boundary 219 between the edge 206 and the edge 208. The section 214 of the surface 204 is substantially parallel to the section 210 of the surface 202, and the section 216 of the surface 204 slopes toward the surface 202 from the boundary 218 toward the edge 208. The section 217 also slopes toward the surface 202 from the boundary 219 toward the edge 206.

The section 216 abuts the edge 208 and the section 217 abuts the edge 206.

As shown in FIG. 2, the section 210 of the surface 202 is substantially parallel to the sections 212 and 213 of the surface 202. Additionally, the section 210 and the section 212 are separated by a step-shaped boundary 220. The step-shaped boundary 220 is substantially perpendicular to the section 210, the section 212, and the section 213. Additionally, the section 210 and the section 213 are separated by a step-shaped boundary 221. The step-shaped boundary 221 is substantially perpendicular to the section 210, the section 212, and the section 213.

In particular embodiments, the section 210 may be raised above the section 212 and/or the section 213 within a range of 0.02 inches to 0.04 inches, within a range of 0.025 inches to 0.035 inches, or within a range of 0.028 inches to 0.032 inches. Other examples are possible.

In certain embodiments, the width of the section 212 is no more than 12 inches, no more than 6 inches, no more than 4 inches, no more than 3.5 inches, or within a range of 0.5 to 3.5 inches. In this context, the width of the section 212 is defined as spanning between the boundary 220 and the edge 208 (e.g., along the y-axis).

In certain embodiments, the width of the section 213 is no more than 12 inches, no more than 6 inches, no more than 4 inches, no more than 3.5 inches, or within a range of 0.5 to 3.5 inches. In this context, the width of the section 213 is defined as spanning between the boundary 221 and the edge 206 (e.g., along the y-axis).

In some embodiments, the width of the section 216 is no more than 12 inches, no more than 6 inches, no more than 4 inches, no more than 3.5 inches, or within a range of 0.5 to 3.5 inches. In this context, the width of the section 216 is defined as spanning between the boundary 218 and the edge 208 (e.g., along the y-axis).

In certain embodiments, the width of the section 217 is no more than 12 inches, no more than 6 inches, no more than 4 inches, no more than 3.5 inches, or within a range of 0.5 to 3.5 inches. In this context, the width of the section 217 is defined as spanning between the boundary 219 and the edge 206 (e.g., along the y-axis).

In certain embodiments, the width of the section 212 is no more than 50% different from, no more than 20% different from, or even substantially equal to the width of the section 216. In other embodiments, the width of the section 212 is at least twice as large as, or no more than half as large as the width of the section 216.

Similarly, in certain embodiments, the width of the section 213 is no more than 50% different from, no more than 20% different from, or even substantially equal to the width of the section 217. In other embodiments, the width of the section 213 is at least twice as large as, or no more than half as large as the width of the section 217.

In the embodiment of FIG. 2, the boundary 221 is at the same position as the boundary 219 with respect to the y-axis. Similarly, the boundary 220 is at the same position as the boundary 218 with respect to the y-axis.

In other embodiments, the first section of the first surface extends beyond the boundary separating the first and second sections of the second surface with respect to the y-axis, and the boundary separating the first and second sections of the first surface is to the right of the boundary separating the first and second sections of the second surface.

In yet other embodiments, the second section of the first surface extends beyond the boundary that separates the first section of the second surface and the second section of the second surface.

As the person of ordinary skill in the art will appreciate, the plaster boards described herein may be made using a variety of different inorganic base materials. For example, in certain embodiments of the plaster boards and methods as otherwise described herein, the plaster material comprises a base material that is a gypsum material. In other embodiments of the plaster boards and methods as otherwise described herein, the plaster material comprises a base material that is, for example, lime or cement. The hardened plaster material may include one or more fillers or additives in the base plaster material(s), e.g., fiberglass, a plasticizer material, and/or a foaming agent.

Figure 3:
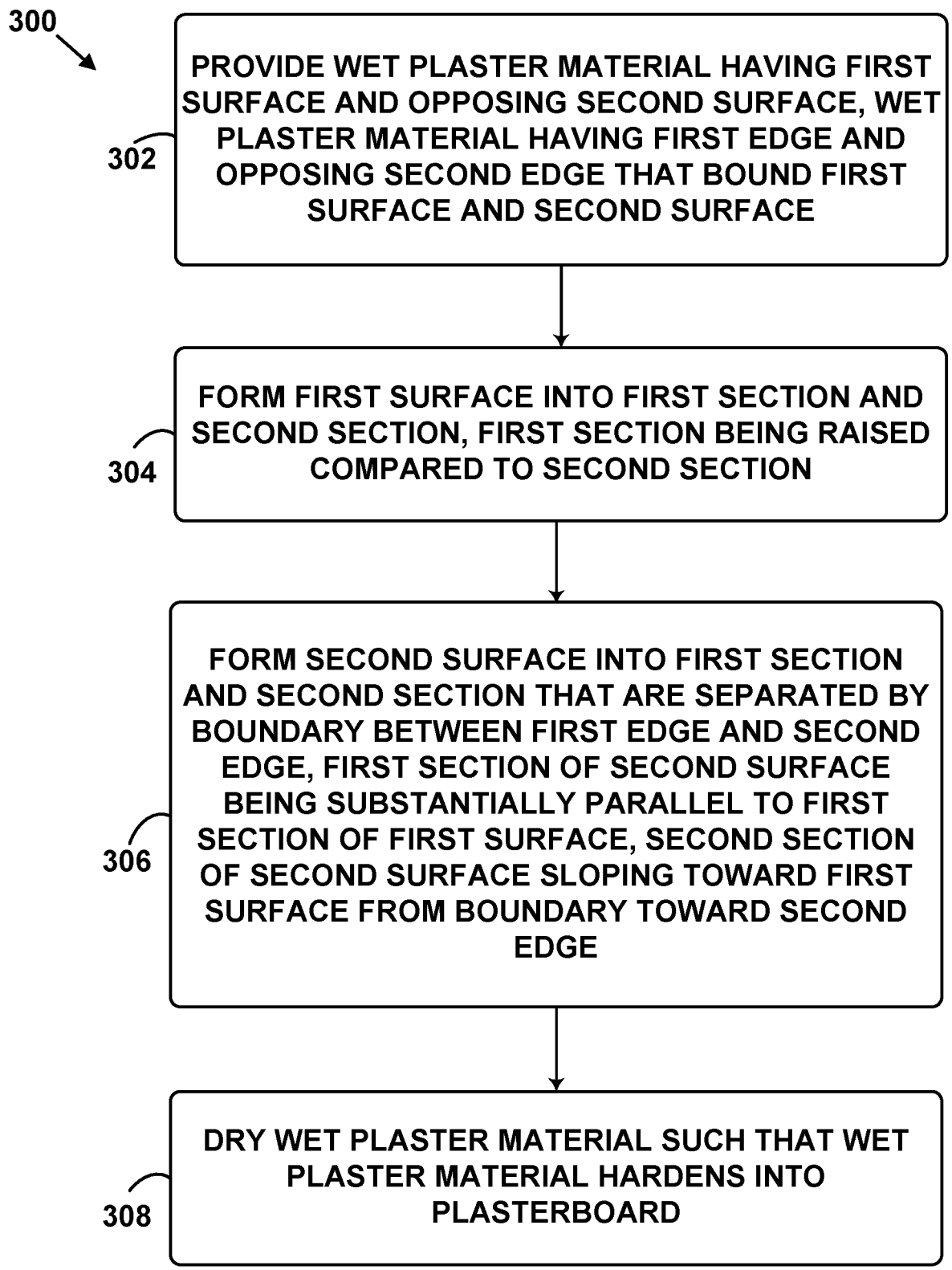
FIG. 3 is a block diagram of a method according to another embodiment of the disclosure.

FIG. 3 is a block diagram for a method 300 for forming a plasterboard. For example, the method 300 could be used to form the plasterboards 200A, 200B, or 500 of FIG. 2, 6, 7, or 8.

At block 302, the method 300 includes providing wet plaster material having a first surface and an opposing second surface. The wet plaster material has a first edge and an opposing second edge that bound the first surface and the second surface.

Figure 4:
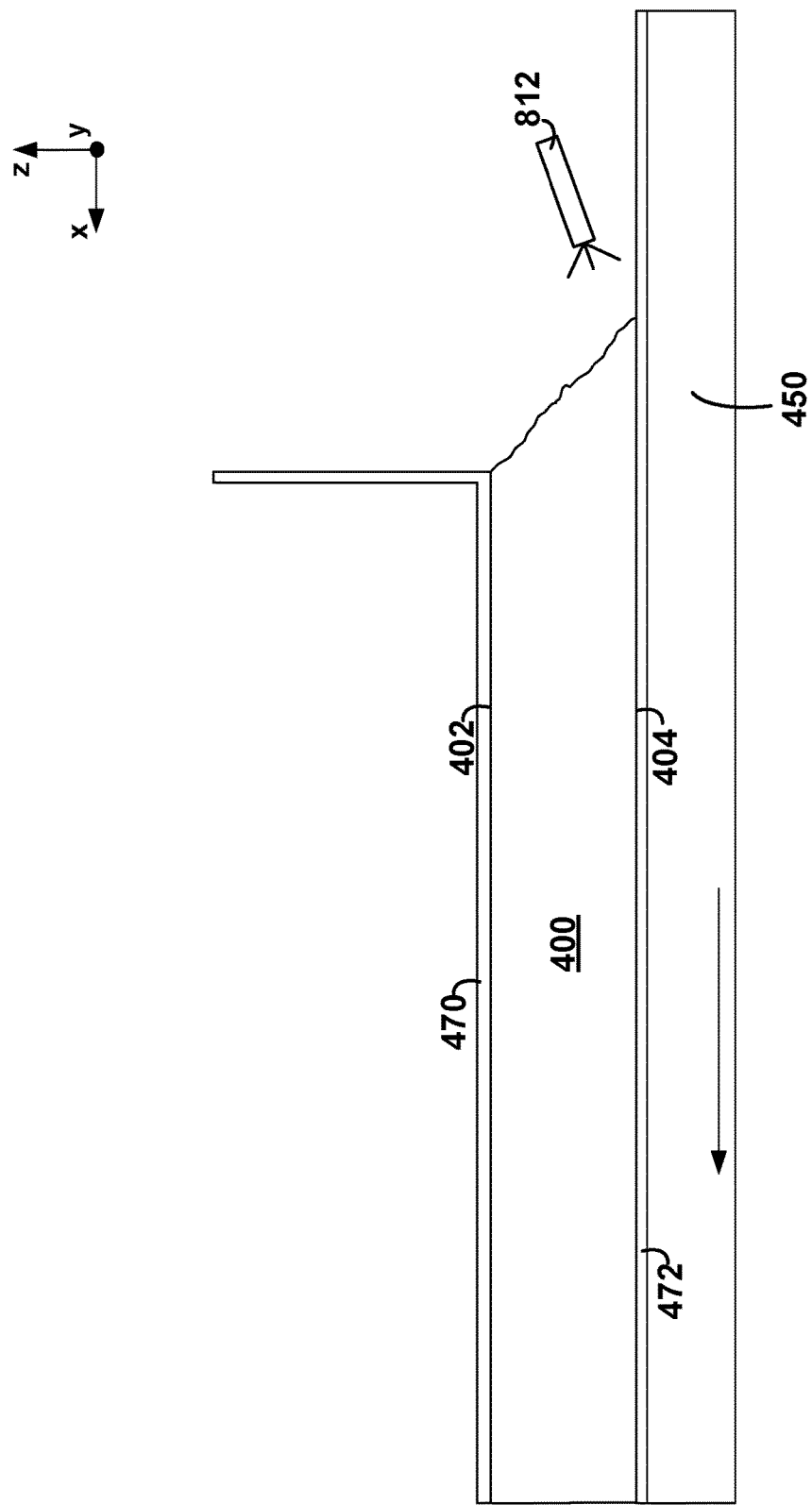
FIG. 4 is a cross-sectional view of wet plaster material being dispensed and formed according to another embodiment of the disclosure.
Figure 5:
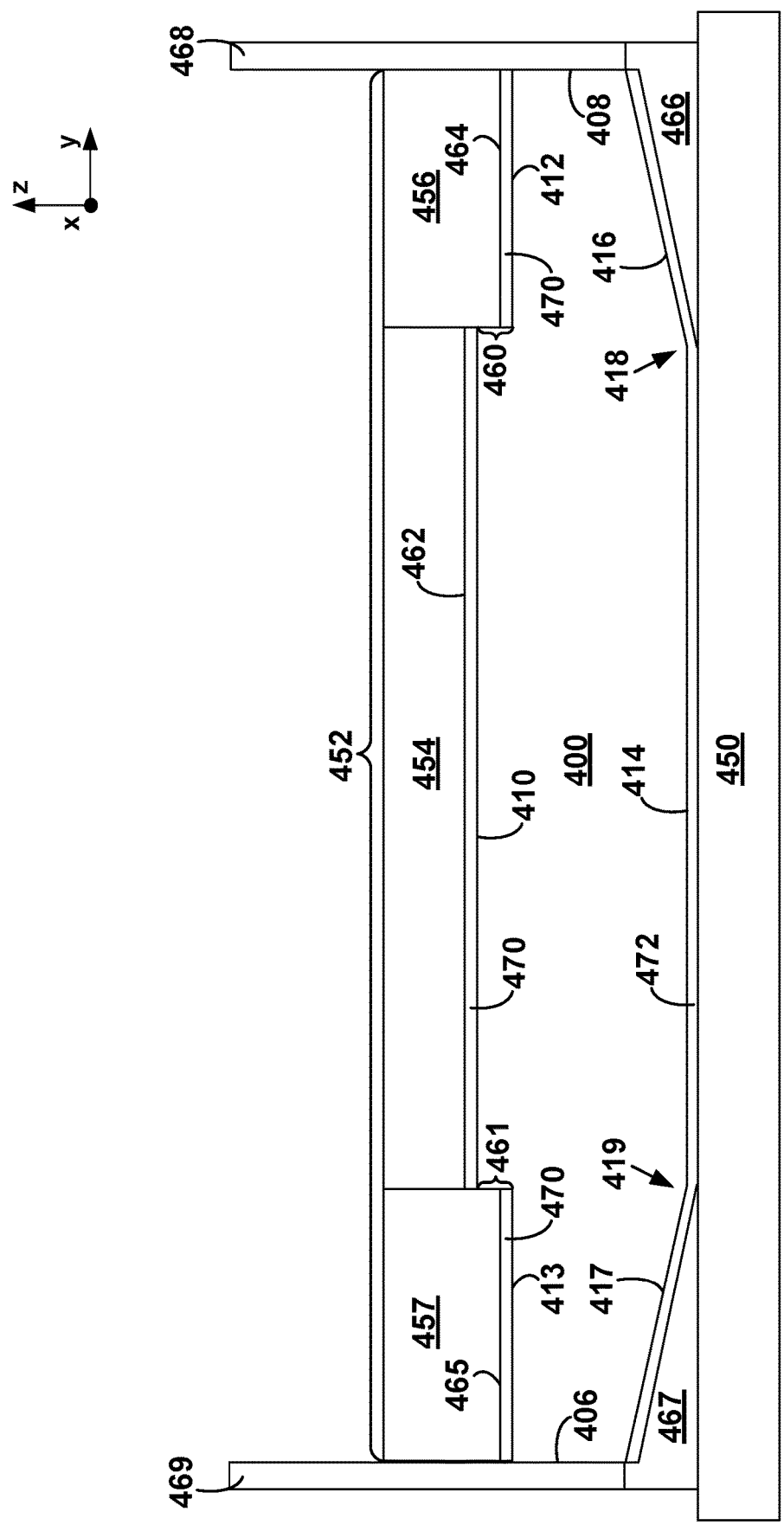
FIG. 5 is a schematic cross-sectional view of wet plaster material being formed according to another embodiment of the disclosure.

FIG. 4 is a x-z plane view of wet plaster material 400 (e.g., gypsum slurry, cement, and/or lime) being provided (e.g. dispensed). The wet plaster material 400 has a surface 402 and an opposing surface 404. FIG. 5, a y-z plane view of the wet plaster material 400, shows that the wet plaster material 400 has an edge 406 and an opposing edge 408 that bound the surface 402 and the surface 404. The edge 406 is formed against a guide element 469 and the edge 408 is formed against a guide element 468. The surface 402 is at least partially covered with the facing layer 470 and the surface 404 is at least partially covered with the facing layer 472.

The wet plaster material 400 is a wet formable body (i.e., including water) that can be dried to provide a plaster board (e.g., plasterboards 200A or 200B). The person of ordinary skill in the art will appreciate that a variety of wet plaster materials can be used in the practice of the processes as described herein. The wet plaster material can include any additives or fillers familiar to the person of ordinary skill in the art. The wet plaster material is desirably a semiliquid or otherwise formable mixture that can be, for example, dispensed and spread onto a surface such as a platform or conveyer.

In some examples, providing the wet plaster material 400 involves dispensing the wet plaster material 400, via a dispenser 812, onto a platform 450. The platform 450 may be a stationary platform like a table in some examples. In other examples, the platform 450 may take the form of a moving conveyor and providing the wet plaster material 400 may involve dispensing the wet plaster material 400 onto the conveyor as the conveyor moves from right to left (e.g., with reference to FIG. 4). The facing layer 472 may be disposed on the platform 450, such that the wet plaster material 400 is dispensed on and spread onto the facing layer 472. Additionally, the facing layer 470 may be applied to the surface 402 of the wet plaster material 400.

At block 304, the method 300 includes forming the first surface into a first section and a second section, the first section being raised compared to the second section. The second section abuts the second edge. Referring to FIGS. 4 and 5 for example, the surface 402 of the wet plaster material 400 may be formed into sections 410, 412, and 413. As shown, the section 410 may be raised with respect to the sections 412 and 413. The section 412 abuts the edge 408 and the section 417 abuts the edge 406. In some embodiments, the surface 402 may be formed by using the guide element 452, which may take the form of one or more plastic flaps or another solid structure.

The guide element 452 may include a part 454, a part 456, and a part 457. The section 410 of the wet plaster material 400 may be formed with the part 454, the section 412 of the wet plaster material 400 may be formed with the part 456, and the section 413 of the wet plaster material 400 may be formed with the part 457. The parts 454, 456, and 457 may together form a single flap or solid structure or they may be independent flaps or structures. As shown, the parts 456 and 457 extend beyond (e.g., below) the part 454 toward the wet plaster material 400. In particular embodiments, the parts 456 and 457 are c-shaped sheet metal "shims" that fit over the part 454 (e.g., an extruder plate). Additionally, there may be additional instances of flaps, structures, shims, ironing bars, or edger bars similar to the parts 454, 456, and 457 at various locations along the length (e.g., x-axis) of the platform 450. As such, the surface 402 may be formed using structures that are located at several locations along the length of the platform 450.

The parts 454 and 456 form a step-shaped structure that forms a step-shaped boundary 460 that is substantially perpendicular to the sections 410 and 412. Additionally, the parts 454 and 457 form a step-shaped structure that forms a step-shaped boundary 461 that is substantially perpendicular to the sections 410 and 413. In this way, the guide element 452 may be used to form the surface 402 such that the section 410 is substantially parallel to, but raised above, the sections 412 and/or 413.

The part 454 includes a surface 462 that is substantially parallel to a surface 464 of the part 456. The surface 462 is also substantially parallel to a surface 465 of the part 457. The surface 462 may be raised with respect to the surface 465 and/or the surface 464 such that the section 410 is raised above the section 413 and/or the section 412 by 0.02 inches to 0.04 inches, 0.025 inches to 0.035 inches, or 0.028 inches to 0.032 inches, for example.

The surface 464 and/or the surface 465 may have respective widths (along the y-axis) such that the section 413 and/or the section 412 are formed to have respective widths (along the y-axis) that are no more than 12 inches, no more than 6 inches, no more than 4 inches, no more than 3.5 inches, or within a range of 0.5 to 3.5 inches.

At block 306, the method 300 includes forming the second surface into a first section and a second section that are separated by a boundary between the first edge and the second edge, the first section of the second surface being substantially parallel to the first section of the first surface, the second section of the second surface sloping toward the first surface from the boundary toward the second edge.

Referring to FIG. 5 for example, the surface 404 is formed into a section 414 and a section 416 that are separated by a boundary 418 between the edge 406 and the edge 408. The section 414 of the surface 404 is substantially parallel to the section 410 of the surface 402. Additionally, the section 416 of the surface 404 slopes toward the surface 402 from the boundary 418 toward the edge 408, and the section 417 of the surface 404 slopes toward the surface 402 from the boundary 419 toward the edge 406.

The surface 404 may be formed using a (second) guide element taking the form of the platform 450, a wedge-shaped shim 466 (e.g., an elongated taper belt having a tapered profile), and a wedge-shaped shim 467 (e.g., an elongated taper belt having a tapered profile). The platform 450 may be used to form the section 414, the wedge-shaped shim 466 may be used to form the section 416, and the wedge-shaped shim 467 may be used to form the section 417. As shown, the wedge-shaped shims 466 and 467 both extend beyond (e.g., above) the platform 450 toward the wet plaster material 400. More specifically, the wedge-shaped shims 466 and 467 rest on top of the platform 450 as the wet plaster material is dispensed onto the facing layer 472 above the platform 450 and the wedge-shaped shims 466 and 467. The wedge-shaped shims 466 and 467 also extend beyond the respective edges 406 and 408 along the y-axis.

The wedge-shaped shim 466 may have a width (along the y-axis) of no more than 13 inches, no more than 7 inches, or within the range of 1.5 to 4.5 inches. Accordingly, the section 416 may have a width (along the y-axis) of no more than 12 inches, no more than 6 inches, or within the range 0.5 to 3.5 inches.

The wedge-shaped shim 467 may have a width (along the y-axis) of no more than 13 inches, no more than 7 inches, or within the range of 1.5 to 4.5 inches. Accordingly, the section 417 may have a width (along the y-axis) of no more than 12 inches, no more than 6 inches, or within the range of 0.5 to 3.5 inches.

In particular embodiments, the first guide element and the second guide element (e.g., a platform and wedge-shaped shims) may have shapes and sizes that form the first surface and the second surface such that the first section of the first surface extends beyond the boundary that separates the first section of the second surface and the second section of the second surface. Additionally or alternatively, the first guide element and the second guide element may have shapes and sizes that form the first surface and the second surface such that the first section of the first surface extends beyond the boundary that separates a third section of the second surface (e.g., a section positioned similar to the section 417) and the first section of the second surface.

In other embodiments, the first guide element and the second guide element may have shapes and sizes that form the first surface and the second surface such that the second section of the second surface extends beyond the boundary that separates the first section of the first surface and the second section of the first surface. Additionally or alternatively, the first guide element and the second guide element may have shapes and sizes that form the first surface and the second surface such that a third section of the second surface (e.g., a section positioned similar to the section 417) extends beyond the boundary that separates a third section of the first surface (e.g., a section positioned similar to the section 413) and the first section of the first surface.

Figure 6:
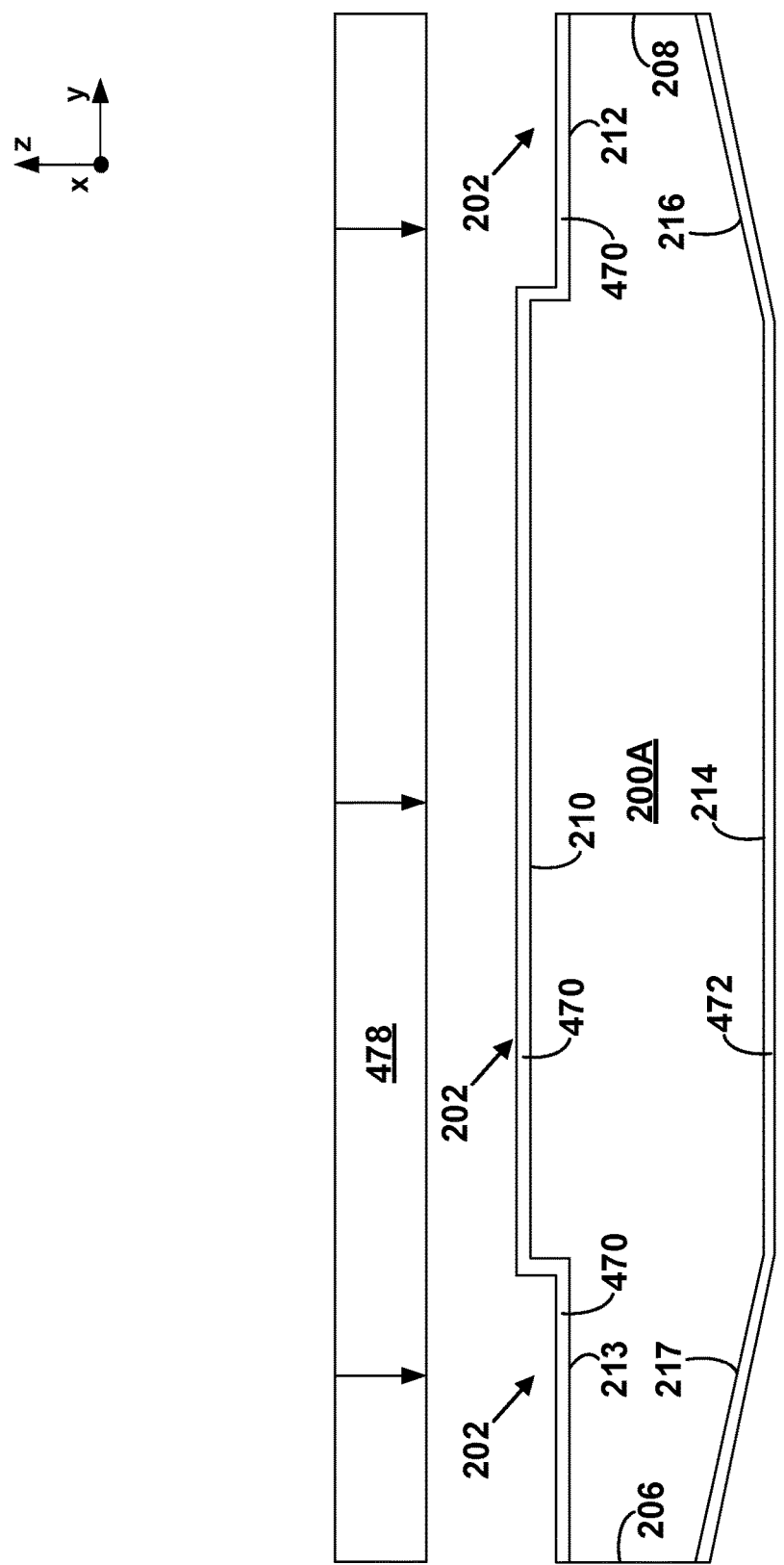
FIG. 6 is a schematic cross-sectional view of a facing layer of a plasterboard being abrasively removed according to another embodiment of the disclosure.
Figure 7:
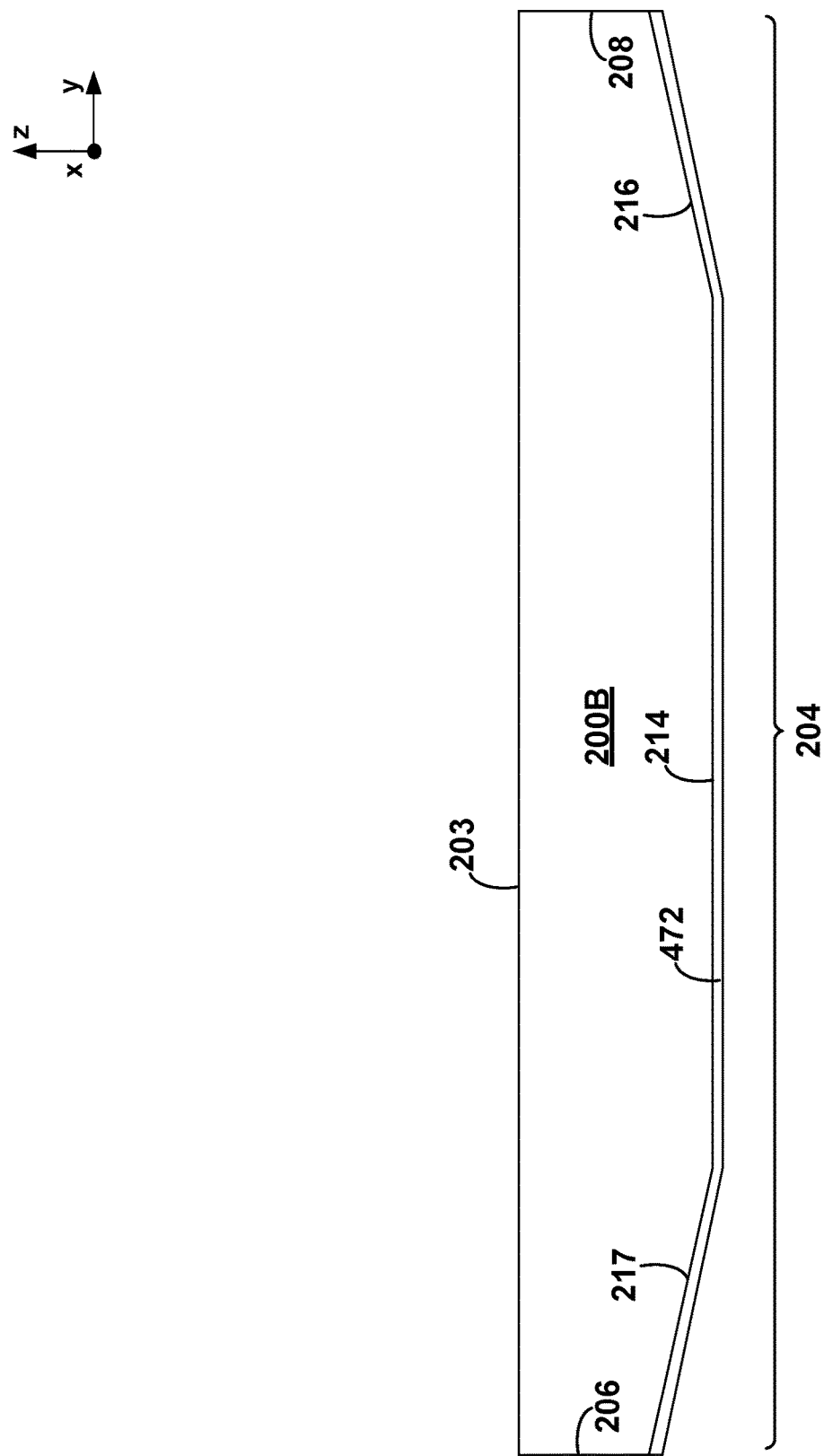
FIG. 7 is a schematic cross-sectional view of a plaster board after removal of a facing layer according to another embodiment of the disclosure.

At block 308, the method includes drying the wet plaster material such that the wet plaster material hardens into a plasterboard. Referring to FIGS. 5 and 6 for example, the wet plaster material 400 is dried to form the plasterboard 200A. The wet plaster material 400 can be heated (e.g., via an oven or a radiant heater) and/or generate some of its own heat via an exothermic reaction. The heat applied or generated during the drying process is desirably sufficient to cure and harden the wet plaster material 400 to form the plasterboard 200A.

Another aspect of the disclosure relates to a plasterboard (e.g., a plasterboard as described herein) made by a method as described herein.

In a variety of fabrication methods of finished drywall boards, it is desirable to remove some or all of a facing layer (e.g., a paper or fiberglass liner) disposed on a surface of the board. As described above, this is often performed abrasively. The present inventors have determined that the tapered plasterboards described herein can advantageously be less susceptible to breakage when a facing layer is removed from the first surface of the board. Accordingly, another aspect of the disclosure relates to a method for removing a facing layer from a surface of a plasterboard. The method includes providing a plasterboard as described herein, the plasterboard having a facing layer at its first surface; and abrasively removing the facing layer from at least a portion of the first section of the first surface of the plasterboard.

For example, as described above with respect to FIG. 2, facing layer 470 may be disposed at the surface 402 of the wet plaster material 400. In the embodiment of FIG. 2, there is also a facing layer 472 disposed at the surface 404 of the wet plaster material 400.

Referring to FIG. 6 as an example, a spinning roller 478 that is coated with abrasive material (e.g., sand, diamond, aluminum oxide, or silicon carbide) may be lowered onto the surface 202 to abrasively remove the facing layer at least in at least part of the first section of the first surface. This can be, for example, performed to re-form the surface 202 into a substantially continuous and level surface at the level of the sections 212 and/or 213 (e.g., to arrive at a plasterboard as described below with respect to FIG. 7). In doing so, the facing layer 470 and a portion of the hardened plaster material that forms the section 210 can also be removed. Once this is done, the plasterboard 200A takes the form of plasterboard 200B shown in FIG. 7. The abrasive removal process can be performed to yields a substantially flat surface 203 at the first surface of the plasterboard. The plasterboard 200B still includes the facing layer 472 on the surface 204. By performing the abrasive removal process discussed above, the result is a tapered plasterboard blank having a flat back surface with no facing layer attached. This process may help avoid breakage of plasterboards during the abrasive removal of the facing layer, as described above.

Accordingly, in certain embodiments of the methods as otherwise described herein, the facing layer is substantially removed from the first section of the plasterboard. In certain such embodiments, as described above with respect to FIGS. 6 and 7, the facing layer is substantially removed from the second section of the first surface of the plasterboard, for example, to provide a substantially flat first surface of the plasterboard.

But in other embodiments, the facing layer is not substantially removed from the second section of the first surface of the plasterboard. As the person of ordinary skill in the art will appreciate based on the present disclosure, as the first section of the first surface is raised with respect to the section of the first surface, the abrasive removal process will contact the first section first; accordingly, it is possible to perform the abrasive removal process to remove the facing layer in the first section without substantially removing the facing layer in the second section. In such an embodiment, the process can be performed so that the abrasive tool does not substantially contact the second section of the first surface (or, if there is contact, the contact has minimal force), such that there is not sufficient force to create the danger of breaking the board in the region of the taper. Such a process can result in a board shown in schematic cross-sectional view in FIG. 8.

In certain embodiments of the methods as otherwise described herein, the abrasive removal can remove plaster material from the first face of the plasterboard. This can be desirable, e.g., to ensure a surface clean of liner material to improve adhesion of other materials to the surface. Removal of plaster material can also allow the shaping of the board, e.g., to provide a substantially flat first surface.

Notably, in certain desirable embodiments, during the abrasive removal, substantially less pressure is put on the second section of the first surface as compared to the first section of the first surface. This can be a result of the different heights of the first and second section of the first surface, and can advantageously help avoid breakage in the region of the second section of the second surface. This can be true even in cases where the second section of the second surface is not supported (e.g., by a shim or other structure to counteract any downward pressure) during the abrasive removal.

Such methods can be advantageously used to make sound-dampening wallboards. For example, in certain embodiments, the plasterboard is a first plasterboard, and the method further includes, after the abrasive removal, applying a viscoelastic polymer to the first surface of the first plasterboard and/or to a surface of a second plasterboard, and securing the first surface of the first plasterboard to the second plasterboard via the viscoelastic polymer.

Figure 9:
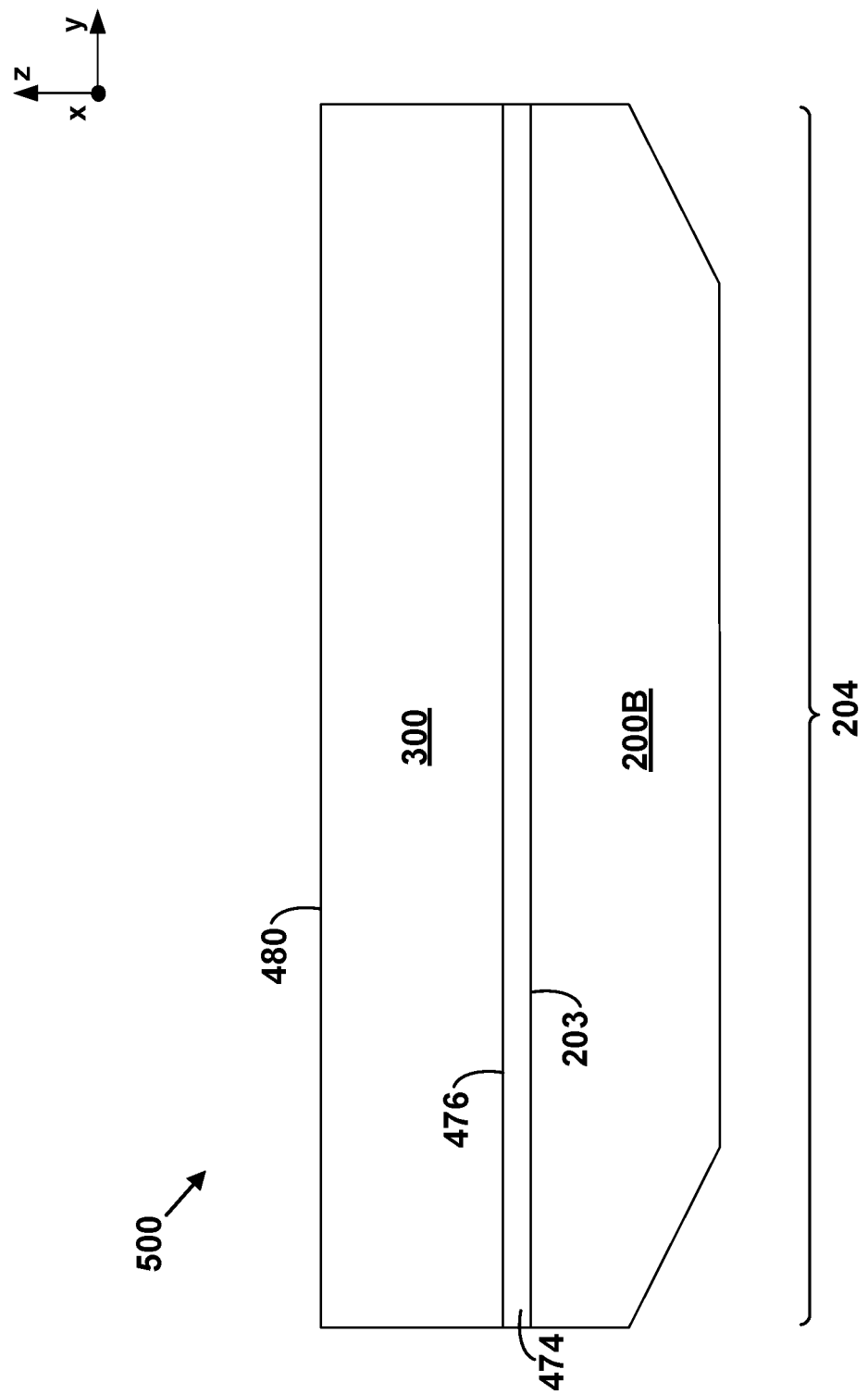
FIG. 9 is a schematic cross-sectional view of a tapered sound damping plasterboard according to another embodiment of the disclosure.

Referring to FIG. 9, a viscoelastic polymer 474 is applied to either the surface 203 of the plasterboard 200B or a surface 476 of a plasterboard 300, thus forming a tapered sound damping plasterboard 500. A back surface 480 of the plasterboard 300 (e.g., the tapered sound damping plasterboard 500) may be placed in a wall space against studs leaving the tapered surface 204 exposed.

The viscoelastic polymer may include or be filled with a fire resistant material (e.g., zinc borate) and/or a mold resistant material. In various embodiments of the plaster boards and methods as described herein, the viscoelastic polymer may take the form of a viscoelastic polymer layer or may take the form of a carrier sheet having a viscoelastic polymer disposed thereon. The carrier sheet (whether used in a damping layer or in a different continuous layer) can be formed from a variety of materials, e.g., sheet materials that are capable of carrying a viscoelastic polymer. For example, in certain embodiments of the plaster boards and methods as described herein, the carrier sheet comprises (or is) a paper sheet. In other embodiments of the plaster boards and methods as described herein, the carrier sheet comprises (or is) a fiberglass mat or a fiberglass fabric. In other embodiments of the plaster boards and methods as described herein, the carrier sheet comprises (or is) a woven or non-woven fabric, such as a felt. In other embodiments of the plaster boards and methods as described herein, the carrier sheet comprises (or is) a sheet of foamed polymer, e.g., the foamed polymer sheet sold by BASF under the trade name BASOTECT. In other embodiments of the plaster boards and methods as described herein, the carrier sheet comprises (or is) a polymer sheet, e.g., a thin polymer sheet of the type typically used as a plastic release liner for an adhesive, which can be, for example in the range of 0.001-0.002" thick. In other embodiments, the carrier sheet can be an adhesive sheet, e.g., with adhesive such as a pressure-sensitive adhesive presented at one or both surfaces thereof. Such pressure-sensitive adhesive sheets can be formed from a core sheet (made, e.g., from PVC or PET) with adhesive (e.g., a silicone pressure-sensitive adhesive or a polyacrylate adhesive) disposed on both sides thereof.

The viscoelastic polymer can be disposed on the carrier sheet in variety of manners. For example, in certain embodiments of the plaster boards and methods as described herein, the viscoelastic polymer is impregnated on the carrier sheet (e.g., when the carrier sheet has some level of porosity). In certain embodiments, the viscoelastic polymer is formed as a layer on one or both sides of the carrier sheet. The viscoelastic polymer can, for example, be impregnated into the pores of the carrier sheet and form layers on either side of the carrier sheet.

As noted above, a variety of viscoelastic polymers can be used in the plaster boards and methods of the disclosure. In various embodiments of the plaster boards and methods as described herein, the viscoelastic polymer is polyvinyl butryal, a silicone, or an acrylic. The viscoelastic polymer can be a thermally-cured material, e.g., a cured adhesive such as those available under the tradename GreenGlue. Various viscoelastic glues made by Weber may also be suitable for use. Viscoelastic polymer compositions are also described in U.S. Pat. Nos. 8,028,800 and 9,157,241, each of which is hereby incorporated herein by reference in its entirety.

The plasterboards and methods of the disclosure are further described by the following non-limiting enumerated embodiments, which can be combined in any logically and technically consistent fashion.

Embodiment 1

A plasterboard comprising:
a first surface and an opposing second surface, and
a first edge and an opposing second edge that bound the first surface and the second surface,
the first surface comprising a first section and a second section, the first section being raised compared to the second section, the second section abutting the second edge,
the second surface comprising a first section and a second section that are separated by a boundary between the first edge and the second edge, the first section of the second surface being substantially parallel to the first section of the first surface, the second section of the second surface sloping toward the first surface from the boundary toward the second edge.

Embodiment 2

The plasterboard of embodiment 1, wherein the second section of the second surface abuts the second edge.

Embodiment 3

The plasterboard of any of embodiments 1-2, wherein the plasterboard comprises hardened plaster material.

Embodiment 4

The plasterboard of any of embodiments 1-3, wherein the first section of the first surface is substantially parallel to the second section of the first surface.

Embodiment 5

The plasterboard of any of embodiments 1-4, wherein the first section of the first surface and the second section of the first surface are separated by a step-shaped boundary.

Embodiment 6

The plasterboard of embodiment 5, wherein the step-shaped boundary is substantially perpendicular to the first section of the first surface and the second section of the first surface.

Embodiment 7

The plasterboard of any of embodiments 1-4, wherein the first section of the first surface and the second section of the first surface are separated by a sloped boundary.

Embodiment 8

The plasterboard of any of embodiments 1-7, wherein the first section of the first surface is raised above the second section of the first surface by at least 0.01 inches, e.g., at least 0.02 inches.

Embodiment 9

The plasterboard of any of embodiments 1-8, wherein the first section of the first surface is raised above the second section of the first surface by no more than 0.1 inches, e.g., no more than 0.05 inches.

Embodiment 10

The plasterboard of any of embodiments 1-9, wherein the first section of the first surface is raised above the second section of the first surface within a range of 0.02 inches to 0.04 inches.

Embodiment 11

The plasterboard of any of embodiments 1-9, wherein the first section of the first surface is raised above the second section of the first surface within a range of 0.025 inches to 0.035 inches.

Embodiment 12

The plasterboard of any of embodiments 1-7, wherein the first section of the first surface is raised above the second section of the first surface within a range of 0.028 inches to 0.032 inches.

Embodiment 13

The plasterboard of any of embodiments 1-12, wherein a width of the second section of the first surface is no more than 12 inches, for example, no more than 6 inches, the width spanning between (i) a boundary that separates the first section of the first surface and the second section of the first surface and (ii) the second edge.

Embodiment 14

The plasterboard of any of embodiments 1-12, wherein a width of the second section of the first surface is no more than 4 inches, e.g., no more than 3.5 inches, the width spanning between (i) a boundary that separates the first section of the first surface and the second section of the first surface and (ii) the second edge.

Embodiment 15

The plasterboard of any of embodiments 1-12, wherein a width of the second section of the first surface is within a range of 0.5 to 3.5 inches, the width spanning between (i) a boundary that separates the first section of the first surface and the second section of the first surface and (ii) the second edge.

Embodiment 16

The plasterboard of any of embodiments 1-15, wherein a width of the second section of the second surface is no more than 12 inches, e.g., no more than 6 inches, the width of the second section of the second surface spanning between (i) the boundary that separates the first section of the second surface and the second section of the second surface and (ii) the second edge.

Embodiment 17

The plasterboard of any of embodiments 1-15, wherein a width of the second section of the second surface is no more than 4 inches, e.g., no more than 3.5 inches, the width of the second section of the second surface spanning between (i) the boundary that separates the first section of the second surface and the second section of the second surface and (ii) the second edge.

Embodiment 18

The plasterboard of any of embodiments 1-15, wherein a width of the second section of the second surface is within a range of 0.5 to 3.5 inches, the width of the second section of the second surface spanning between (i) the boundary that separates the first section of the second surface and the second section of the second surface and (ii) the second edge.

Embodiment 19

The plasterboard of any of embodiments 1-18, wherein a width of the second section of the first surface is no more than 50% different, e.g., no more than 20% different, from a width of the second section of the second surface,
  wherein the width of the second section of the first surface spans between (i) a boundary that separates the first section of the first surface and the second section of the first surface and (ii) the second edge, and
  wherein the width of the second section of the second surface spans between (i) the boundary that separates the first section of the second surface and the second section of the second surface and (ii) the second edge.

Embodiment 20

The plasterboard of any of embodiments 1-18, wherein a width of the second section of the first surface is substantially equal to a width of the second section of the second surface,
  wherein the width of the second section of the first surface spans between (i) a boundary that separates the first section of the first surface and the second section of the first surface and (ii) the second edge, and
  wherein the width of the second section of the second surface spans between (i) the boundary that separates the first section of the second surface and the second section of the second surface and (ii) the second edge.

Embodiment 21

The plasterboard of any of embodiments 1-18, wherein a width of the second section of the first surface is at least twice as large as a width of the second section of the second surface,
  wherein the width of the second section of the first surface spans between (i) a boundary that separates the first section of the first surface and the second section of the first surface and (ii) the second edge, and
  wherein the width of the second section of the second surface spans between (i) the boundary that separates the first section of the second surface and the second section of the second surface and (ii) the second edge.

Embodiment 22

The plasterboard of any of embodiments 1-18, wherein a width of the second section of the second surface is at least twice as large as a width of the second section of the first surface,
  wherein the width of the second section of the first surface spans between (i) a boundary that separates the first section of the first surface and the second section of the first surface and (ii) the second edge, and
  wherein the width of the second section of the second surface spans between (i) the boundary that separates the first section of the second surface and the second section of the second surface and (ii) the second edge.

Embodiment 23

The plasterboard of any of embodiments 1-22, wherein the first section of the first surface extends beyond the boundary that separates the first section of the second surface and the second section of the second surface.

Embodiment 24

The plasterboard of any of embodiments 1-22, wherein the second section of the first surface extends beyond the boundary that separates the first section of the second surface and the second section of the second surface.

Embodiment 25

The plasterboard of any of embodiments 1-24, comprising a facing layer at the first surface of the plasterboard.

Embodiment 26

A method of forming any of the plasterboards of embodiments 1-25, the method comprising:
  providing wet plaster material having a first surface and an opposing second surface, the wet plaster material having a first edge and an opposing second edge that bound the first surface and the second surface,
  forming the first surface into a first section and a second section, the first section being raised compared to the second section, the second section abutting the second edge,
  forming the second surface into a first section and a second section that are separated by a boundary between the first edge and the second edge, the first section of the second surface being substantially parallel to the first section of the first surface, the second section of the second surface sloping toward the first surface from the boundary toward the second edge, and
  drying the wet plaster material such that the wet plaster material hardens into a plasterboard.

Embodiment 27

The method of embodiment 26, wherein providing the wet plaster material comprises dispensing the wet plaster material onto a conveyor.

Embodiment 28

The method of embodiment 27, wherein dispensing the wet plaster material onto a conveyor comprises dispensing the wet plaster material onto a facing layer that is on top of the conveyor.

Embodiment 29

The method of any of embodiments 26-28, wherein forming the first surface comprises using a first guide element to form the first surface.

Embodiment 30

The method of embodiment 29, wherein forming the first surface comprises:
  using a first part of the first guide element to form the first section of the first surface,
  using a second part of the first guide element to form the second section of the first surface,
  wherein the second part extends beyond the first part toward the wet plaster material.

Embodiment 31

The method of embodiment 30, wherein the first part of the first guide element and the second part of the first guide element form a step-shaped structure.

Embodiment 32

The method of any of embodiments 30-31, wherein the first part of the first guide element hangs above the wet plaster material and the second part of the first guide element extends below the first part of the first guide element.

Embodiment 33

The method of any of embodiments 30-31, wherein the first part of the first guide element comprises a surface that is substantially parallel to a surface of the second part of the first guide element.

Embodiment 34

The method of any of embodiments 30-33, wherein forming the first surface comprises using the first guide element to form the first surface such that the first section of the first surface is substantially parallel to the second section of the first surface.

Embodiment 35

The method of any of embodiments 30-34, wherein forming the first surface comprises using the first guide element to form the first surface such that the first section of the first surface and the second section of the first surface are separated by a step-shaped boundary.

Embodiment 36

The method of embodiment 35, wherein the step-shaped boundary is substantially perpendicular to the first section of the first surface and the second section of the first surface.

Embodiment 37

The method of any of embodiments 30-36, wherein forming the first surface comprises using the first guide element to form the first surface such that the first section of the first surface is raised above the second section of the first surface by at least 0.01 inches, e.g., at least 0.02 inches.

Embodiment 38

The method of any of embodiments 30-36, wherein forming the first surface comprises using the first guide element to form the first surface such that the first section of the first surface is raised above the second section of the first surface by no more than 0.1 inches, e.g., no more than 0.05 inches.

Embodiment 39

The method of any of embodiments 30-36, wherein forming the first surface comprises using the first guide element to form the first surface such that the first section of the first surface is raised above the second section of the first surface within a range of 0.02 inches to 0.04 inches.

Embodiment 40

The method of any of embodiments 30-36, wherein forming the first surface comprises using the first guide element to form the first surface such that the first section of the first surface is raised above the second section of the first surface within a range of 0.025 inches to 0.035 inches, e.g., within a range of 0.028 inches to 0.032 inches.

Embodiment 41

The method of any of embodiments 30-40, wherein forming the first surface comprises using the first guide element to form the first surface such that a width of the second section of the first surface is no more than 12 inches, e.g., no more than 6 inches, the width spanning between (i) a boundary that separates the first section of the first surface and the second section of the first surface and (ii) the second edge.

Embodiment 42

The method of any of embodiments 30-40, wherein forming the first surface comprises using the first guide element to form the first surface such that a width of the second section of the first surface is no more than 4 inches, e.g., no more than 3.5 inches, the width spanning between (i) a boundary that separates the first section of the first surface and the second section of the first surface and (ii) the second edge.

Embodiment 43

The method of any of embodiments 30-40, wherein forming the first surface comprises using the first guide element to form the first surface such that a width of the second section of the first surface is within a range of 0.5 to 3.5 inches, the width spanning between (i) a boundary that separates the first section of the first surface and the second section of the first surface and (ii) the second edge.

Embodiment 44

The method of any of embodiments 30-43, wherein forming the second surface comprises using a second guide element to form the second surface.

Embodiment 45

The method of embodiment 44, wherein forming the second surface comprises:
using a first part of the second guide element to form the first section of the second surface,
using a second part of the second guide element to form the second section of the second surface,
wherein the second part of the second guide element extends beyond the first part of the second guide element toward the wet plaster material.

Embodiment 46

The method of embodiment 45, wherein the first part of the second guide element supports the wet plaster material and the second part of the second guide element is above the first part of the second guide element.

Embodiment 47

The method of any of embodiments 45-6 wherein the first part of the second guide element comprises a conveyor surface.

Embodiment 48

The method of any of embodiments 45-47, wherein the second part of the second guide element comprises a wedge-shaped shim.

Embodiment 49

The method of any of embodiments 45-47, wherein the second part of the second guide element comprises a taper belt having a tapered profile.

Embodiment 50

The method of any of embodiments 45-49, wherein forming the second surface comprises using the second guide element to form the second surface such that a width of the second section of the second surface is no more than 12 inches, e.g., no more than 6 inches, the width of the second section of the second surface spanning between (i) the boundary that separates the first section of the second surface and the second section of the second surface and (ii) the second edge.

Embodiment 51

The method of any of embodiments 45-49, wherein forming the second surface comprises using the second guide element to form the second surface such that a width of the second section of the second surface is no more than 4 inches, e.g., no more than 3.5 inches, the width of the second section of the second surface spanning between (i) the boundary that separates the first section of the second surface and the second section of the second surface and (ii) the second edge.

Embodiment 52

The method of any of embodiments 45-49, wherein forming the second surface comprises using the second guide element to form the second surface such that a width of the second section of the second surface is within a range of 0.5 to 3.5 inches, the width of the second section of the second surface spanning between (i) the boundary that separates the first section of the second surface and the second section of the second surface and (ii) the second edge.

Embodiment 53

The method of any of embodiments 26-52, wherein providing the wet plaster material comprises:
  forming the first edge against one or more first edge guide elements, and
  forming the second edge against one or more second edge guide elements.

Embodiment 54

The method of any of embodiments 26-53, wherein forming the first surface comprises forming the first surface such that the first section of the first surface extends beyond the boundary that separates the first section of the second surface and the second section of the second surface.

Embodiment 55

The method of any of embodiments 26-54, wherein forming the first surface comprises forming the first surface such that the second section of the first surface extends beyond the boundary that separates the first section of the second surface and the second section of the second surface.

Embodiment 56

A plasterboard (e.g., according to any of embodiments 1-25) made by a method of any of embodiments 26-55.

Embodiment 57

A method for removing a facing layer from a surface of a plasterboard, the method comprising:
  providing a plasterboard according to any of embodiments 1-25 and 56, the plasterboard having a facing layer at its first surface; and
  abrasively removing the facing layer from at least a portion of the first section of the first surface of the plasterboard.

Embodiment 58

The method of embodiment 57, wherein the facing layer is substantially removed from the first section of the first surface of the plasterboard.

Embodiment 59

The method of embodiment 58, wherein the facing layer is substantially removed from the second section of the first surface of the plasterboard, e.g., to provide a substantially flat first surface of the plasterboard.

Embodiment 60

The method of embodiment 58, wherein the facing layer is not substantially removed from the second section of the first surface of the plasterboard.

Embodiment 61

The method of any of embodiments 57-60, wherein the abrasive removal also removes plaster material from the first face of the plasterboard.

Embodiment 62

The method of any of embodiments 57-61, wherein during the abrasive removal, substantially less pressure is put on the second section of the first surface as compared to the first section of the first surface.

Embodiment 63

The method of any of embodiments 57-62, wherein the facing layer comprises paper, fiberglass, and/or thermoplastic.

Embodiment 64

The method of any of embodiments 57-63, wherein the second section of the second surface is not supported during the abrasive removal.

Embodiment 65

The method of any of embodiments 57-64, wherein the plasterboard is a first plasterboard, the method further comprising:
  after the abrasive removal, applying a viscoelastic polymer to the first surface of the first plasterboard and/or to a surface of a second plasterboard, and securing the first surface of the first plasterboard to the second plasterboard via the viscoelastic polymer.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A plasterboard comprising a body of hardened plaster and a facing layer disposed at a first surface of the plasterboard, the plasterboard having:
   a second surface opposing the first surface, and
   a first edge and an opposing second edge that bound the first surface and the second surface,
   the first surface comprising a first section and a second section, the first section being raised compared to the second section, the second section abutting the second edge,
   the second surface comprising a first section and a second section disposed between the first section and the second edge, the first section and the second section being separated by a boundary between the first edge and the second edge, the first section of the second surface being substantially parallel to the first section of the first surface, the second section of the second surface sloping toward the first surface from the boundary toward the second edge,
   wherein the facing layer is not substantially present on the first section of the first surface, but is substantially present on the second section of the first surface of the plasterboard.

2. The plasterboard of claim 1, wherein the second section of the second surface abuts the second edge.

3. The plasterboard of claim 1, wherein the first section of the first surface is substantially parallel to the second section of the first surface.

4. The plasterboard of claim 1, wherein the first section of the first surface and the second section of the first surface are separated by a step-shaped boundary.

5. The plasterboard of claim 4, wherein the step-shaped boundary is substantially perpendicular to the first section of the first surface and the second section of the first surface.

6. The plasterboard of claim 1, wherein the first section of the first surface and the second section of the first surface are separated by a sloped boundary.

7. The plasterboard of claim 1, wherein the first section of the first surface is raised above the second section of the first surface by at least 0.02 inches.

8. The plasterboard of claim 1, wherein the first section of the first surface is raised above the second section of the first surface by no more than 0.1 inches.

9. The plasterboard of claim 1, wherein a width of the second section of the first surface is no more than 4 inches, the width spanning between (i) a boundary that separates the first section of the first surface and the second section of the first surface and (ii) the second edge.

10. The plasterboard of claim 1, wherein a width of the second section of the second surface is no more than 4 inches, the width of the second section of the second surface spanning between (i) the boundary that separates the first section of the second surface and the second section of the second surface and (ii) the second edge.

11. The plasterboard of claim 1, wherein a width of the second section of the first surface is no more than 50% different from a width of the second section of the second surface,
    wherein the width of the second section of the first surface spans between (i) a boundary that separates the first section of the first surface and the second section of the first surface and (ii) the second edge, and
    wherein the width of the second section of the second surface spans between (i) the boundary that separates the first section of the second surface and the second section of the second surface and (ii) the second edge.

12. The plasterboard of claim 1, wherein a width of the second section of the first surface is at least twice as large as a width of the second section of the second surface,
    wherein the width of the second section of the first surface spans between (i) a boundary that separates the first section of the first surface and the second section of the first surface and (ii) the second edge, and
    wherein the width of the second section of the second surface spans between (i) the boundary that separates the first section of the second surface and the second section of the second surface and (ii) the second edge.

13. The plasterboard of claim 1, wherein a width of the second section of the second surface is at least twice as large as a width of the second section of the first surface,
    wherein the width of the second section of the first surface spans between (i) a boundary that separates the first section of the first surface and the second section of the first surface and (ii) the second edge, and
    wherein the width of the second section of the second surface spans between (i) the boundary that separates the first section of the second surface and the second section of the second surface and (ii) the second edge.

14. The plasterboard of claim 1, wherein the first section of the first surface extends beyond the boundary that separates the first section of the second surface and the second section of the second surface.

15. The plasterboard of claim 1, wherein the second section of the first surface extends beyond the boundary that separates the first section of the second surface and the second section of the second surface.

16. A method of forming the plasterboard of claim 1, the method comprising:
    providing wet plaster material having a first surface and an opposing second surface, the wet plaster material having a first edge and an opposing second edge that bound the first surface and the second surface,
    forming the first surface into a first section and a second section, the first section being raised compared to the second section, the second section abutting the second edge,
    forming the second surface into a first section and a second section that are separated by a boundary between the first edge and the second edge, the first section of the second surface being substantially parallel to the first section of the first surface, the second section of the second surface sloping toward the first surface from the boundary toward the second edge, and
    drying the wet plaster material such that the wet plaster material hardens into a plasterboard.

17. The method of claim 16, wherein forming the first surface comprises:
    using a first part of a first guide element to form the first section of the first surface,
    using a second part of the first guide element to form the second section of the first surface, wherein the second part extends beyond the first part toward the wet plaster material.

18. A method for removing a facing layer from a surface of a plasterboard, the method comprising:
providing a plasterboard comprising a body of hardened plaster and a facing layer disposed at a first surface of the plasterboard, the plasterboard having:
a second surface opposing the first surface, and
a first edge and an opposing second edge that bound the first surface and the second surface,
the first surface comprising a first section and a second section, the first section being raised compared to the second section, the second section abutting the second edge, the facing layer being disposed on the first section and the second section of the first surface,
the second surface comprising a first section and a second section disposed between the first section and the second edge, the first section and the second section being separated by a boundary between the first edge and the second edge, the first section of the second surface being substantially parallel to the first section of the first surface, the second section of the second surface sloping toward the first surface from the boundary toward the second edge; and
abrasively removing the facing layer from at least a portion of the first section of the first surface of the plasterboard.

19. The method of claim 18, wherein the abrasive removal of the facing layer is performed without substantially removing the facing layer from the second section of the first surface.

20. The method of claim 18, wherein the abrasive removal also removes hardened plaster material from the first surface of the wallboard.

21. The method of claim 18, wherein during the abrasive removal, substantially less pressure is put on the second section of the first surface as compared to the first section of the first surface.

22. The method of claim 18, further comprising,
providing a second plasterboard;
after the abrasive removal applying a viscoelastic polymer to at least the first section of the first surface of the first plasterboard, to a major surface of the second plasterboard, or both; and
securing the first surface of the first plasterboard to the major surface of the second plasterboard via the viscoelastic polymer.

23. A sound-dampening wallboard comprising:
a first plasterboard, wherein the first plasterboard is according to claim 1;
a second plasterboard having a major surface; and
a viscoelastic polymer securing the first surface of the first plasterboard to the major surface of the second plasterboard, the viscoelastic polymer being in contact with at least the first section of the first surface of the first plasterboard.

24. A plasterboard according to claim 1, wherein the facing layer is formed of paper.

* * * * *